US008292320B2

(12) United States Patent
Kigawa

(10) Patent No.: US 8,292,320 B2
(45) Date of Patent: Oct. 23, 2012

(54) WHEEL CHAIR FACILITATING GETTING ON AND OFF

(75) Inventor: Yumitsu Kigawa, Santo-gun (JP)

(73) Assignee: Echigo Industry Co., Ltd., Santo-Gun (JP)

( * ) Notice: Subject to any disclaimer, the term of this patent is extended or adjusted under 35 U.S.C. 154(b) by 351 days.

(21) Appl. No.: 12/659,303

(22) Filed: Mar. 3, 2010

(65) Prior Publication Data

US 2011/0140395 A1 Jun. 16, 2011

(30) Foreign Application Priority Data

Dec. 16, 2009 (JP) ................................ 2009-285520
Dec. 16, 2009 (JP) ................................ 2009-285521

(51) Int. Cl.
*B62B 5/04* (2006.01)

(52) U.S. Cl. ................... 280/648; 280/47.38; 280/250.1

(58) Field of Classification Search ............... 280/47.38, 280/47.4, 47.41, 250.1, 642, 643, 647, 648, 280/657; 301/9.1, 9.2, 10.1, 11.1, 11.2, 14, 301/35.1, 35.51; 297/DIG. 4
See application file for complete search history.

(56) References Cited

U.S. PATENT DOCUMENTS 7,464,949 B1 * 12/2008 Downey ..................... 280/250.1

FOREIGN PATENT DOCUMENTS

JP B2-4035730 1/2008

* cited by examiner

*Primary Examiner* — John Walters
(74) *Attorney, Agent, or Firm* — Oliff & Berridge, PLC

(57) ABSTRACT

A wheelchair includes a frame, a seat, a pair of wheels, and a locking mechanism. The seat is disposed on the frame. The pair of wheels is rotatably supported on the frame. At least one of the pair of wheels includes a removable section that is configured to form a part of an outer circumference of the wheel and to be removable when the wheel is at a predetermined angular position, and a remaining section that is configured to form the outer circumference of the wheel together with the removable section. The locking mechanism is configured to lock the wheel at the predetermined angular position. Under the condition where the wheel is locked, the removable section is separated from the remaining section to facilitate a person to get on and off the seat.

11 Claims, 13 Drawing Sheets

WHEEL CHAIR FACILITATING GETTING ON AND OFF

CROSS REFERENCE TO RELATED APPLICATIONS

This application claims priority from Japanese Patent Application No. 2009-285520 filed Dec. 16, 2009 and Japanese Patent Application No. 2009-285521 filed Dec. 16, 2009. The entire contents of these priority applications are incorporated herein by reference.

BACKGROUND OF THE INVENTION

1. Field of the Invention

The present invention relates to a wheelchair for use by hospital patients, physically disabled people, elderly people in assisted living, and the like.

2. Description of the Related Art

Conventionally, a wheelchair has been configured of a frame having left and right side sections, a seat section provided in the frame, and wheels disposed on each of the left and right side sections of the frame. Recently, some conventional wheelchairs have also been provided with a wheel separation mechanism for separating a special fan-shaped section of the wheel, which includes an outer circumferential part of the wheel, from the remaining section constituting the wheel while the wheel is in a specific separating position in order to provide the clearance necessary for a person to get on and off the seat section.

Thus, when a person is getting on or off the seat section of the wheelchair, the special fan-shaped section of the wheel including the outer circumferential part of the wheel is separated from the remaining section while the wheel is in the special separating position in order to form the clearance necessary for getting on and off the seat section of the wheelchair.

SUMMARY OF THE INVENTION

With the conventional structure described above, the wheel must be reliably placed in the separating position before separating the special fan-shaped section from the remaining section. However, it takes great care to visually determine when the wheel is in the correct separating position relative to the seat section. This shortcoming alone reduces the convenience of the wheel separation mechanism.

In view of forgoing, it is an object of the present invention to provide a wheelchair in which the wheel is easily placed in the separating position.

In order to attain the above and other objects, the present invention provides a wheelchair that includes a frame, a seat, a pair of wheels, and a first locking mechanism. The seat is disposed on the frame. The pair of wheels is rotatably supported on the frame. At least one of the pair of wheels includes a removable section that is configured to form a part of an outer circumference of the wheel and to be removable when the wheel is at a predetermined angular position, and a remaining section that is configured to form the outer circumference of the wheel together with the removable section. The first locking mechanism is configured to lock the at least one of the pair of wheels at the predetermined angular position.

According to another aspect, the present invention provides a wheelchair that includes a frame, a seat, a pair of wheels, and a lifting mechanism. The seat is disposed on the frame. The pair of wheels is rotatably supported on the frame. At least one of the pair of wheels includes a removable section that is configured to form a part of an outer circumference of the wheel and to be removable when the wheel is at a predetermined angular position, and a remaining section that is configured to form the outer circumference of the wheel together with the removable section. The lifting mechanism is mounted on the frame and is configured to lift the at least one of the pair of wheels a predetermined distance.

DESCRIPTION OF THE PREFERRED EMBODIMENTS

Figure 1:
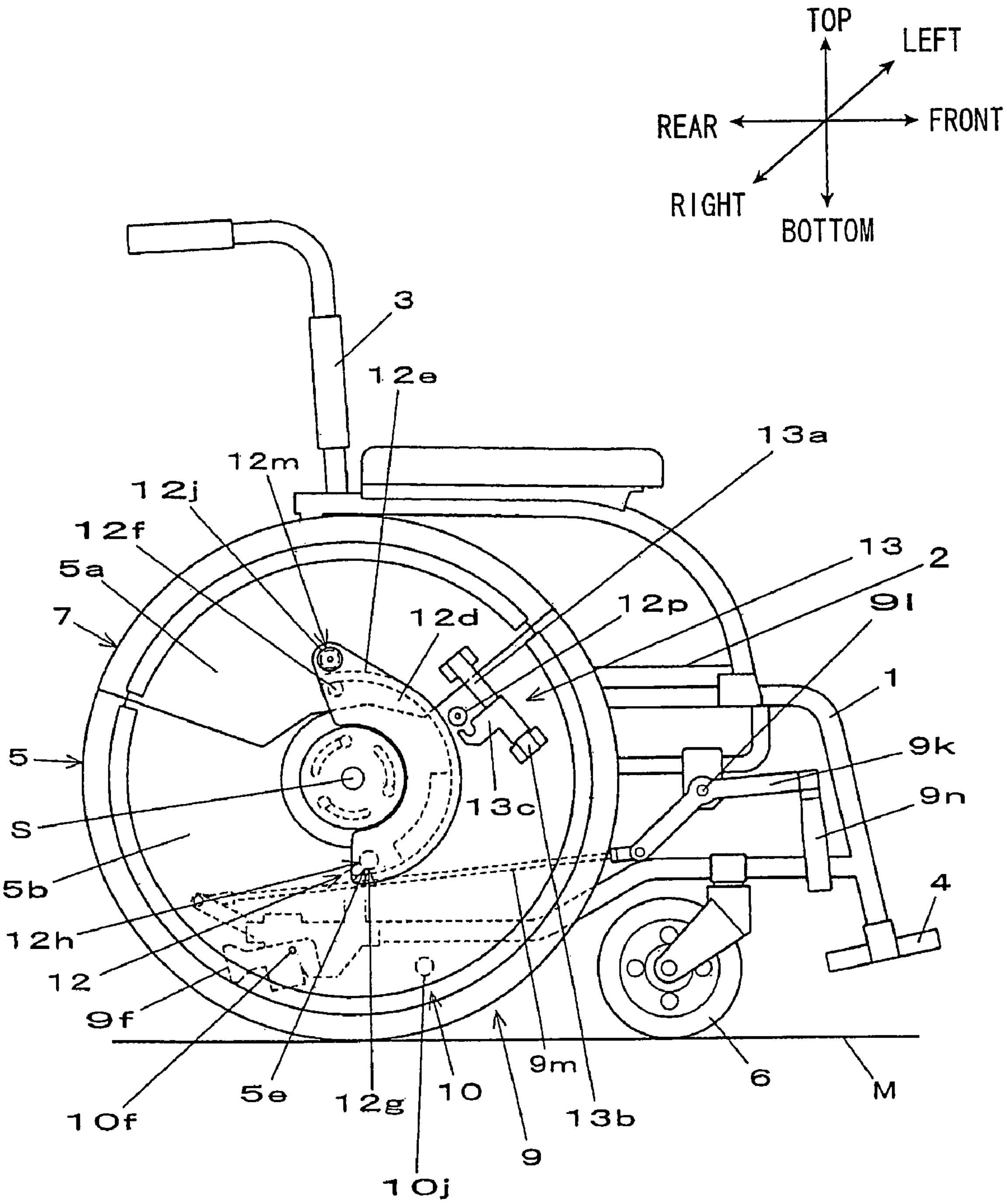
FIG. 1 is a right-side view showing the outer structure of a wheelchair in a running state according to an embodiment of the present invention.

A wheelchair according to embodiment of the invention will be described while referring to the accompanying drawings wherein like parts and components are designated by the same reference numerals to avoid duplicating description.

The terms "top", "bottom", "left", "front", "rear" and the like will be used throughout the description assuming that the wheelchair is disposed in an orientation in which it is intended to be used.

The wheelchair according to the preferred embodiment includes a frame 1 having left and right side parts. A seat 2, a backrest 3, and footrests 4 are disposed on the frame 1 so as to be positioned in a center region between the left and right sides of the frame 1. Large rear wheels 5 and small front wheels 6 are disposed one each on each of the left and right side parts of the frame 1.

The wheels 5 are freely rotatable about an axle S. The wheel includes a hub 5*c* fixed to the frame 1 (see FIG. 8), and a fixing disc 5*d* fixed to the hub 5*c*. The fixing disc 5*d* is formed with a locking hole 5*e* in which a locking pin 12*h* described later is inserted (see FIG. 8). The left and right side parts of the frame are each provided with an armrest that can be retracted through a retracting mechanism, such as a flip-up mechanism.

The wheelchair also includes a wheel separation mechanism 7 and a mounting mechanism 8. The wheel separation mechanism 7 is configured by forming the right wheel 5 in two separate components, including a removable section 5*a* shaped like a folding fan and forming part of the outer circumference of the wheel 5 and a remaining section 5*b* comprising the entire wheel 5 excluding the removable section 5*a*, and by providing the mounting mechanism 8 (see FIG. 8) for detachably mounting the removable section 5*a* on the remaining section 5*b*. The fan-shaped removable section 5*a* has an arc angle of about 120 degrees, while the remaining section 5*b* is formed in an arc shape having an arc angle of about 240 degrees for completing the circular shape of the wheel 5.

Figure 13:
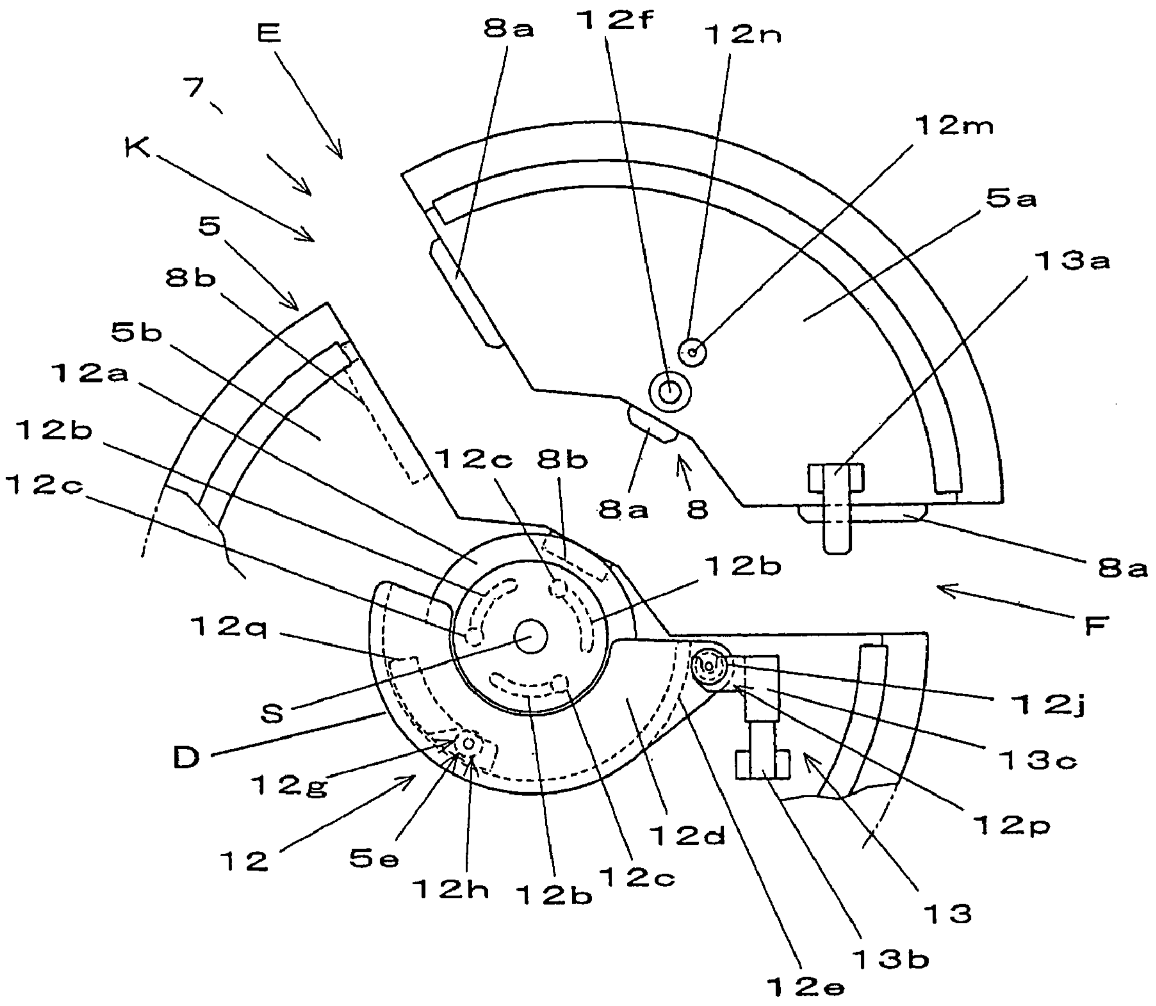
FIG. 13 is a partial right-side view of the wheel when the removable section is separated from the remaining section.

As shown in FIG. 13, the mounting mechanism 8 is provided on the adjoining surfaces of the removable section 5*a* and remaining section 5*b*. Specifically, the mounting mechanism 8 includes engaging protrusions 8*a* disposed on the removable section 5*a*, and engaging recessions 8*b* formed in the remaining section 5*b* at positions aligned with the engaging protrusions 8*a*. The removable section 5*a* is detachably mounted on the remaining section 5*b* by engaging the engaging protrusions 8*a* in the engaging recessions 8*b*. The remaining section 5*b* is pivotably mounted on the axle S and can be rotated to a separating position F for forming clearance K required for a person to get on and off the seat 2 when the removable section 5*a* is removed.

Figure 2:
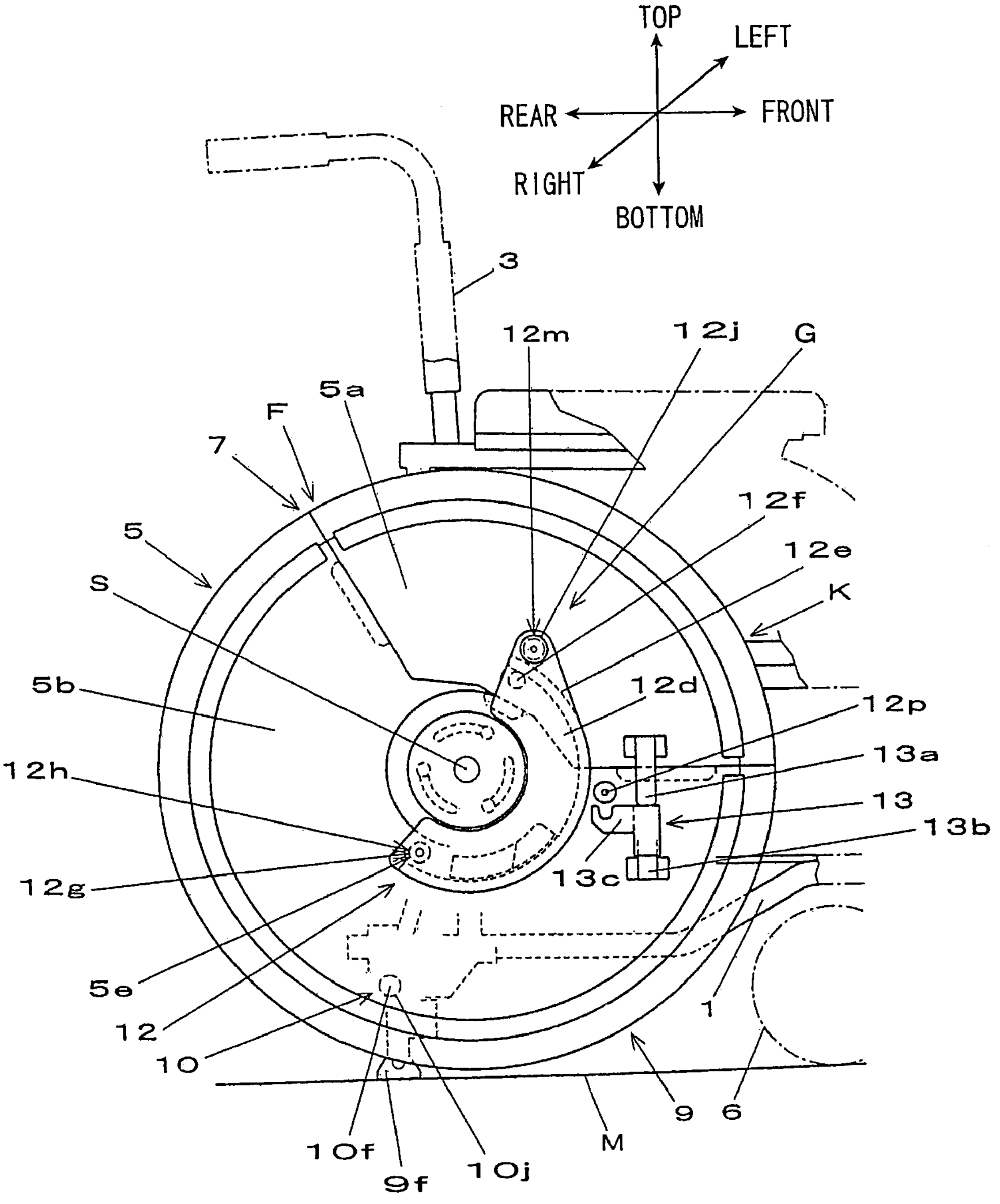
FIG. 2 is a right-side view showing the outer structure of the wheelchair in a state that a wheel is elevated off a contact surface.
Figure 4:
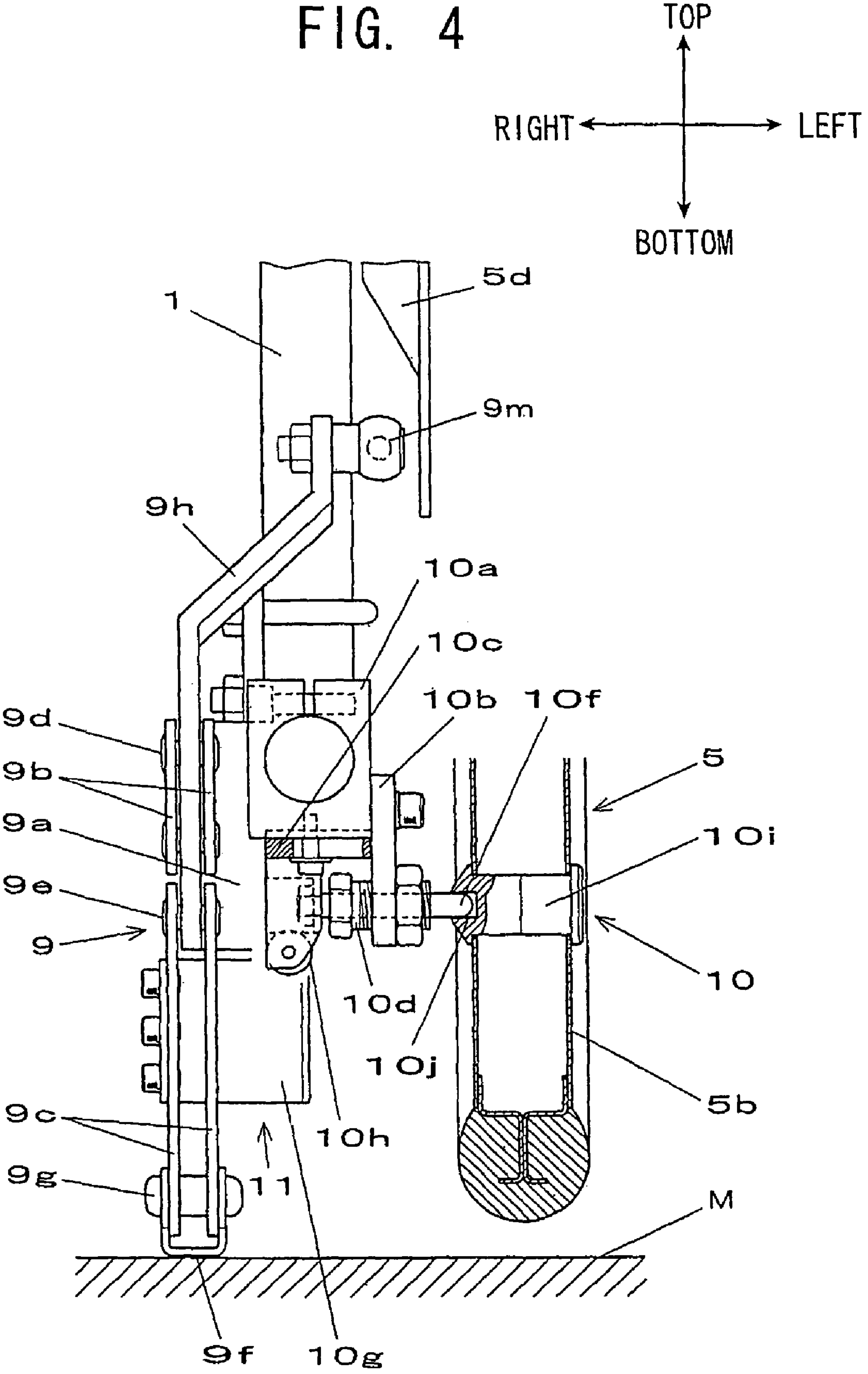
FIG. 4 is an enlarged cross-sectional view of an elevating mechanism and a positioning mechanism when the wheel is elevated off the contact surface.
Figure 5:
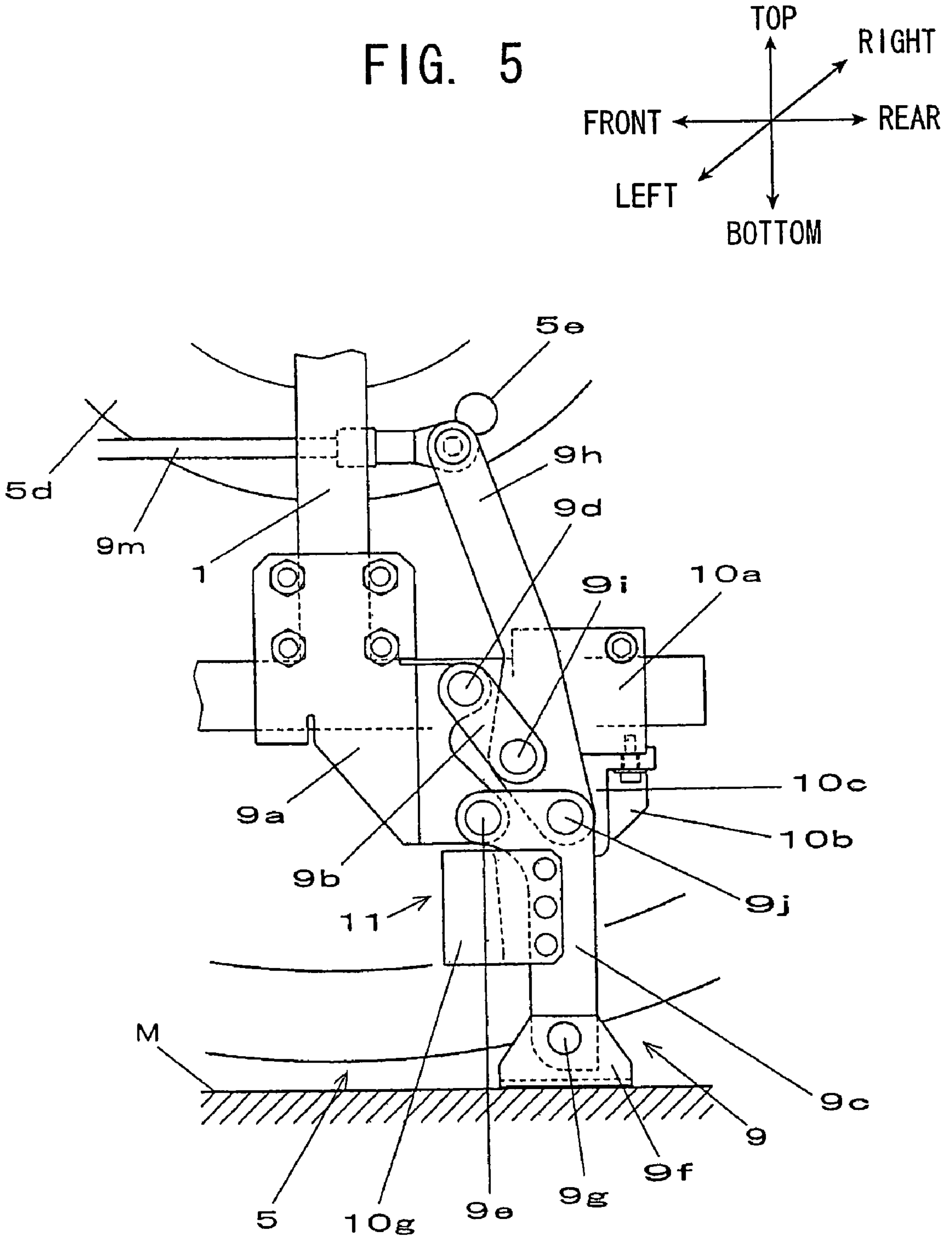
FIG. 5 is an enlarged left-side view of the elevating mechanism when the wheel is elevated off the contact surface.

The wheelchair also has an elevating mechanism 9 to lift the right wheel 5 off a contact surface M as shown in FIG. 2. As shown in FIGS. 4 and 5, the elevating mechanism 9 is configured of a base plate 9*a* mounted on the frame 1; a pair of left and right, upper links 9*b* pivotably mounted on the base plate 9*a* through a support pin 9*d* penetrating the base ends thereof; a pair of left and right L-shaped lower links 9*c* pivotably mounted on the base plate 9*a* through a support pin 9*e* penetrating the base ends thereof; afoot member 9*f* pivotably mounted on the distal ends of the lower links 9*c* via a pin 9*g*; an actuating link 9*h* having a middle part pivotably mounted on the distal ends of the upper links 9*b* via a pin 9*i*, and a lower end pivotably mounted on middle parts of the lower links 9*c* via a pin 9*j*; an operating link 9*k* pivotably mounted on a lower front part of the frame 1 via a pin 9*l* (see FIG. 1); a coupling rod 9*m* coupling one end (rear end) of the operating link 9*k* to an upper end of the actuating link 9*h*; and a handle 9*n* disposed on the other end (front end) of the operating link 9*k*.

Figure 7:
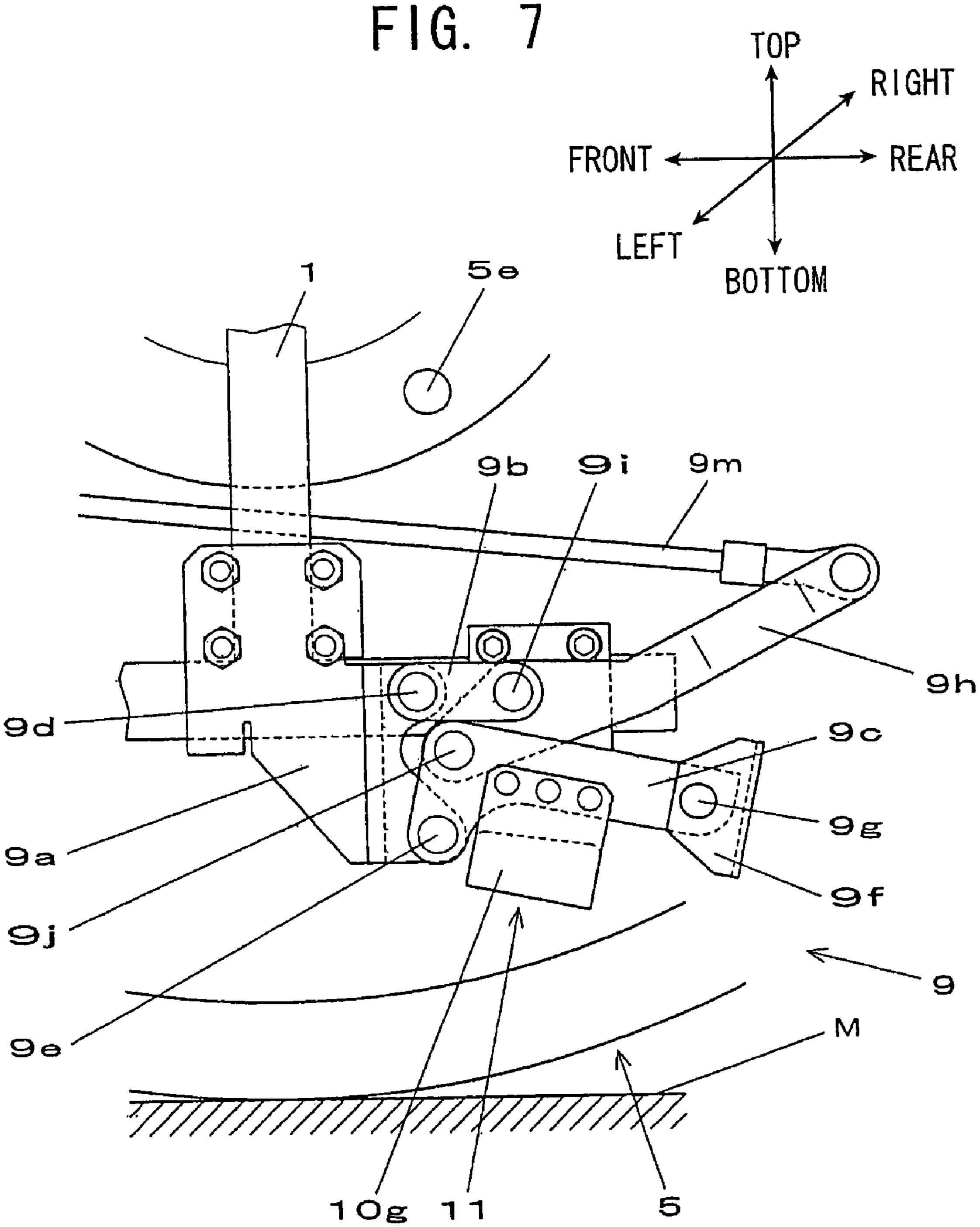
FIG. 7 is an enlarged left-side view of the elevating mechanism when the wheel is in contact with the contact surface.

When the outer periphery of the wheel 5 is resting on the contact surface M, as shown in FIG. 7, the operator can pull on the handle 9*n* to rotate the operating link 9*k* in one direction (counterclockwise in FIG. 1), causing the actuating link 9*h* to rotate upward into a vertical state shown in FIG. 5. Through the upper links 9*b* and lower links 9*c* linked to the actuating link 9*h*, the lower links 9*c* rotate downward into a vertical state as the actuating link 9*h* rotates upward. At this time, the foot member 9*f* disposed on the bottom of the lower links 9*c* contacts the contact surface M and lifts the wheel 5 off the contact surface M, as shown in FIG. 5.

While the wheel 5 is elevated, the operator can push on the handle 9*n* to rotate the operating link 9*k* in the opposite direction (clockwise in FIG. 1), causing the actuating link 9*h* to rotate downward into a horizontal state shown in FIG. 7. At this time, the operations of the upper links 9*b* and lower links 9*c* linked to the actuating link 9*h* cause the lower links 9*c* to rotate upward into a horizontal state as the actuating link 9*h* rotates downward. When the lower links 9*c* rotate upward, the foot member 9*f* separates from the contact surface M, allowing the wheel 5 to come into contact with the contact surface M.

The wheelchair of the preferred embodiment also has a positioning mechanism 10 for positioning the wheel 5 in the separating position F in order to form the clearance K required for a person to get on and off the seat 2.

An interlocking mechanism 11 is also provided for enabling the positioning mechanism 10 when the wheel 5 is elevated and disabling the positioning mechanism 10 when the wheel 5 is resting on the contact surface M.

Figure 6:
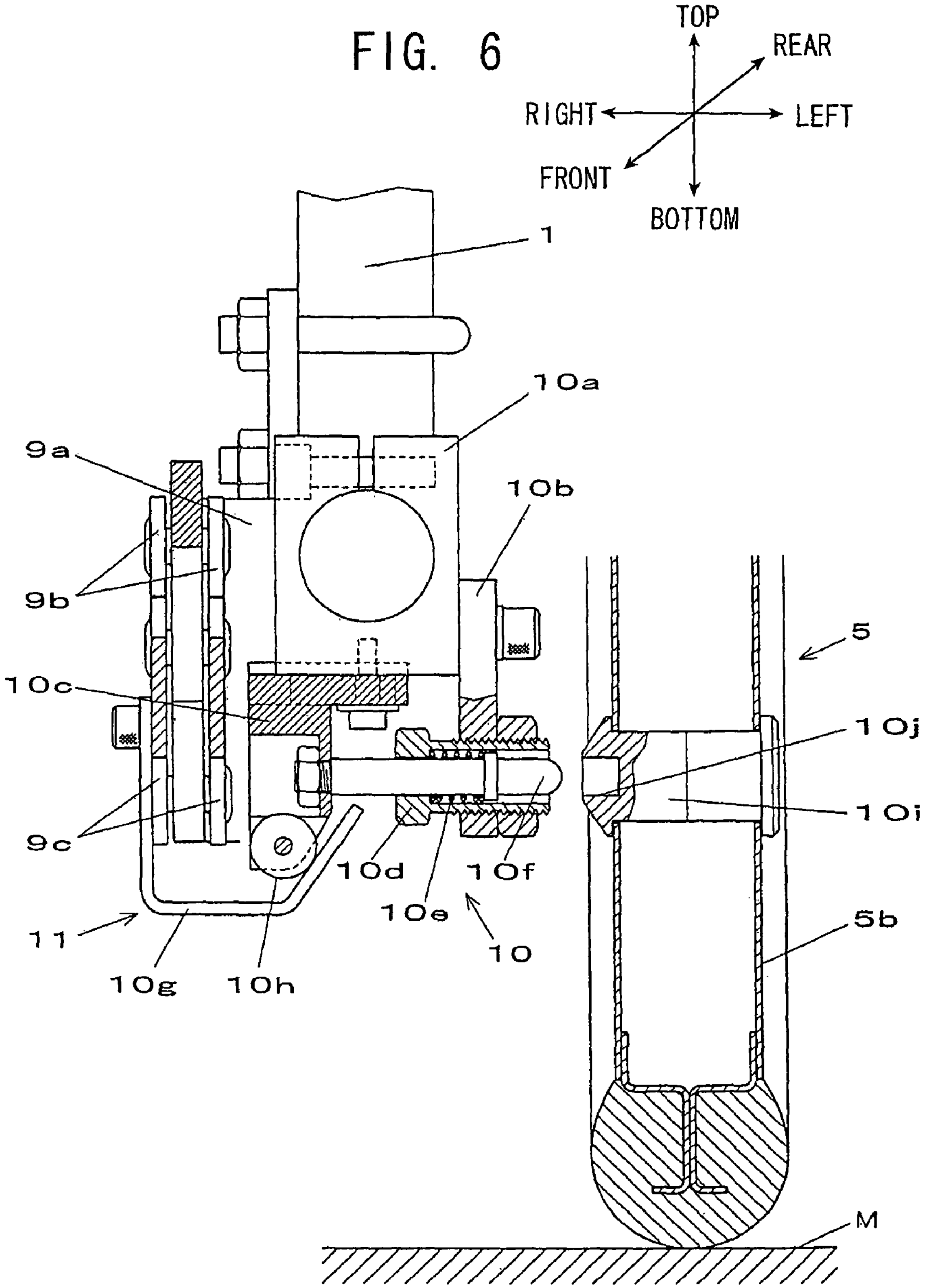
FIG. 6 is an enlarged cross-sectional view of the positioning mechanism when the wheel is in contact with the contact surface.

As shown in FIG. 6, the positioning mechanism 10 includes a mounting piece 10*a* mounted on the frame 1; a support piece 10*b* mounted on the wheel side of the mounting piece 10*a*; a sliding piece 10*c* mounted on the bottom side of the mounting piece 10*a* so as to be capable of sliding in a direction toward and away from the wheel 5; a support cylinder 10*d* mounted on the bottom of the support piece 10*b*; a spring 10*e* disposed in the support cylinder 10*d*; a positioning pin 10*f* mounted in the support cylinder 10*d* and urged toward the wheel 5 by the spring 10*e*, the base end of the positioning pin 10*f* being engaged with the sliding piece 10*c*; a cam plate 10*g* mounted on the outer lower link 9*c*; an actuating roller 10*h* rotatably mounted on the sliding piece 10*c*; a receiving pin 10*i* mounted in the remaining section 5*b* of the wheel 5 at a position opposing the positioning pin 10*f* when the wheel 5 is in the separating position F, the end of the receiving pin 10*i* having a sloped surface that approaches the positioning ping 10*f* toward the center of the same end; and a positioning hole 10*j* formed in the receiving pin 10*i* for receiving a tip end portion of the positioning pin 10*f*.

With this construction, when the foot member 9*f* separates from the contact surface M, placing the wheel 5 in contact with the contact surface M, as shown in FIGS. 1, 6, and 7, the cam plate 10*g* pulls the actuating roller 10*h* in a direction away from the wheel 5. At this time, the positioning pin 10*f* is retracted from the positioning hole 10*j*, allowing the wheel 5 to roll freely on the ground surface.

When the foot member 9*f* is placed in contact with the contact surface M so as to lift the wheel 5 off the contact surface M, as shown in FIGS. 2, 3, 4, and 5, the cam plate 10*g* is separated from the actuating roller 10*h*, and the positioning pin 10*f* protrudes toward the wheel 5 by the urging force of the spring 10*e*. At this time, the wheel 5 can be freely rotated. As the operator rotates the wheel 5 to a position at which the positioning hole 10*j* opposes the positioning pin 10*f* (separating position F), the positioning pin 10*f* slides over the sloped surface formed on the end of the receiving pin 10*i* and is fittingly inserted into the positioning hole 10*j*, as shown in FIG. 4. With the positioning pin 10*f* fitted into the positioning hole 10*j*, the wheel 5 is fixed in the separating position F.

The wheelchair of the preferred embodiment is also provided with a locking mechanism 12 for preventing the wheel 5 from rotating when the wheel 5 is in the separating position F. As shown in FIGS. 1, 8, 9, and 10, the locking mechanism 12 has a rotary plate 12*a* with three crescent-shaped sliding holes 12*b* formed therein. The rotary plate 12*a* is mounted on the hub 5*c* of the wheel 5, which is fixed to the frame 1, by three sliding pins 12*c* inserted through respective sliding holes 12*b*. The rotary plate 12*a* can swivel on the hub 5*c* within the range that the sliding pins 12*c* can slide within the sliding holes 12*b*.

Figure 9:
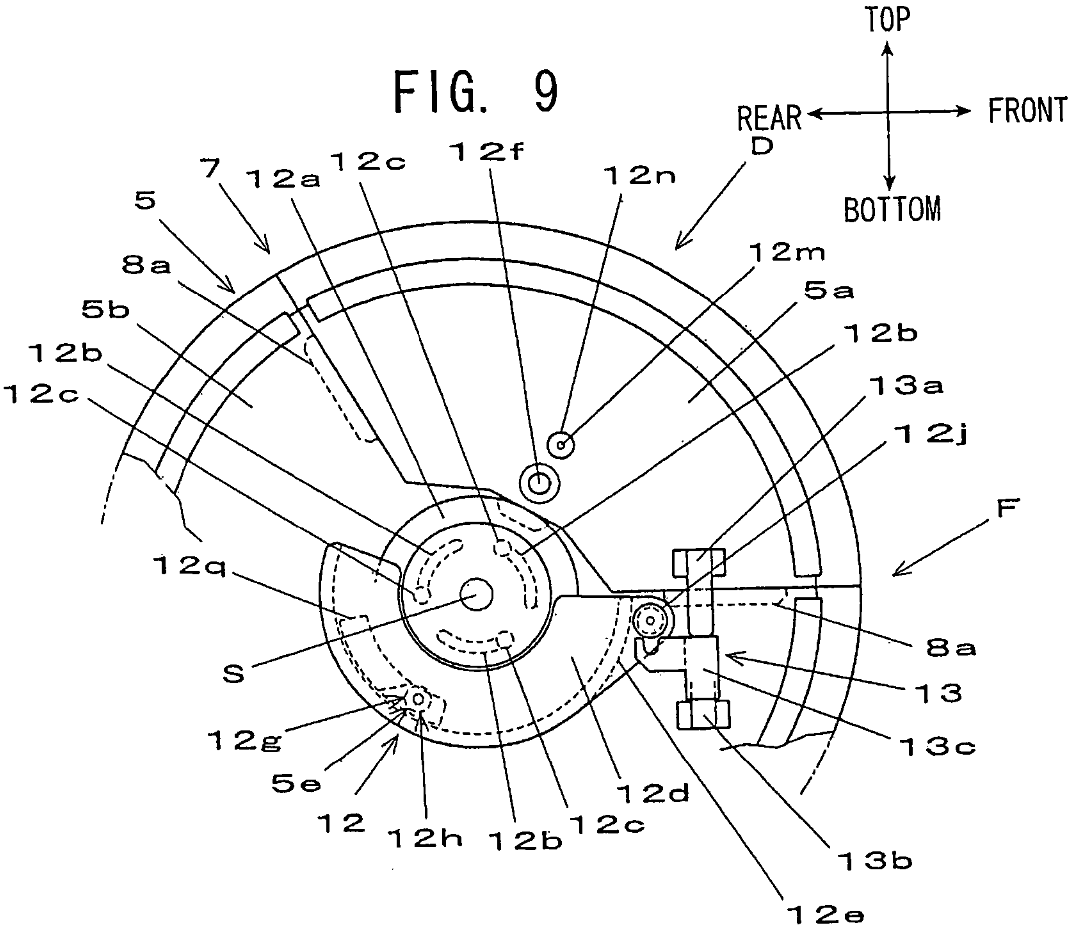
FIG. 9 is a partial side view of the wheel when the wheel is positioned at a separating position and the fan-shape plate is positioned at a mounting position.

The locking mechanism 12 also includes a fan-shaped plate 12*d* shaped substantially like a folding fan that is fixed to the rotary plate 12*a*; a guide rail 12*e* having a semicircular arc shape that is fixed to the outer edge of the fan-shaped plate 12*d*; and a guide roll 12*f* mounted on the removable section 5*a* of the wheel 5 at a position for contacting the inner surface of the guide rail 12*e* (see FIG. 1). With this construction, the rotary plate 12*a* can pivot freely on the wheel 5 with the sliding pins 12*c* fitted in the sliding holes 12*b* and the guide roll 12*f* slidingly contacting the guide rail 12*e*. Specifically, the fan-shape plate 12*d* can pivotably rotate between a mounting position D as shown in FIG. 9 and a locking position G as shown in FIG. 2.

Figure 8:
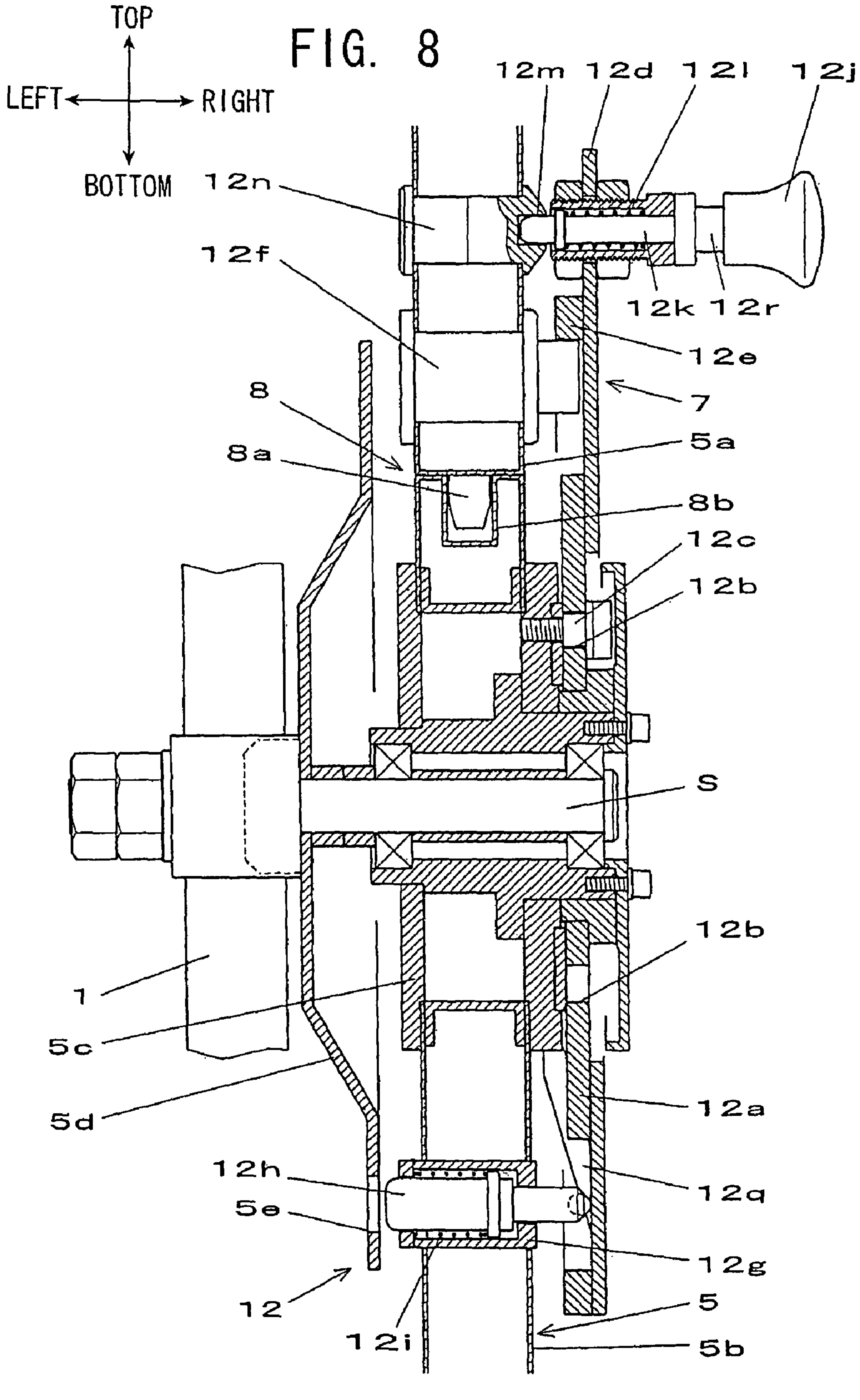
FIG. 8 is an enlarged cross-sectional view showing a locking mechanism when a fan-shape plate is positioned at a locking position.

As shown in FIG. 8, the locking mechanism 12 also includes a sliding cylinder 12*g* mounted on the wheel 5; a locking pin 12*h* slidably disposed in the sliding cylinder 12*g*; and a spring 12*i* disposed in the sliding cylinder 12*g* for urging the locking pin 12*h* toward the fan-shaped plate 12*d*. An operating pin 12*k* having a knob 12*j* on one end thereof is disposed in the fan-shaped plate 12*d* and is capable of sliding in a direction toward and away from the wheel 5. A spring 12*l* is provided for urging the operating pin 12*k* toward the wheel 5. The operating pin 12*k* is formed with a groove 12*r* which is selectively engaged with a groove 13*d* described later.

The locking mechanism 12 also includes a receiving pin 12*n* provided in the removable section 5*a* of the wheel 5. The receiving pin 12*n* has a positioning hole 12*m* formed therein for receiving a tip end portion of the operating pin 12*k* when the fan-shape plate 12*d* is positioned at the locking position G as shown in FIG. 2.

Figure 12:
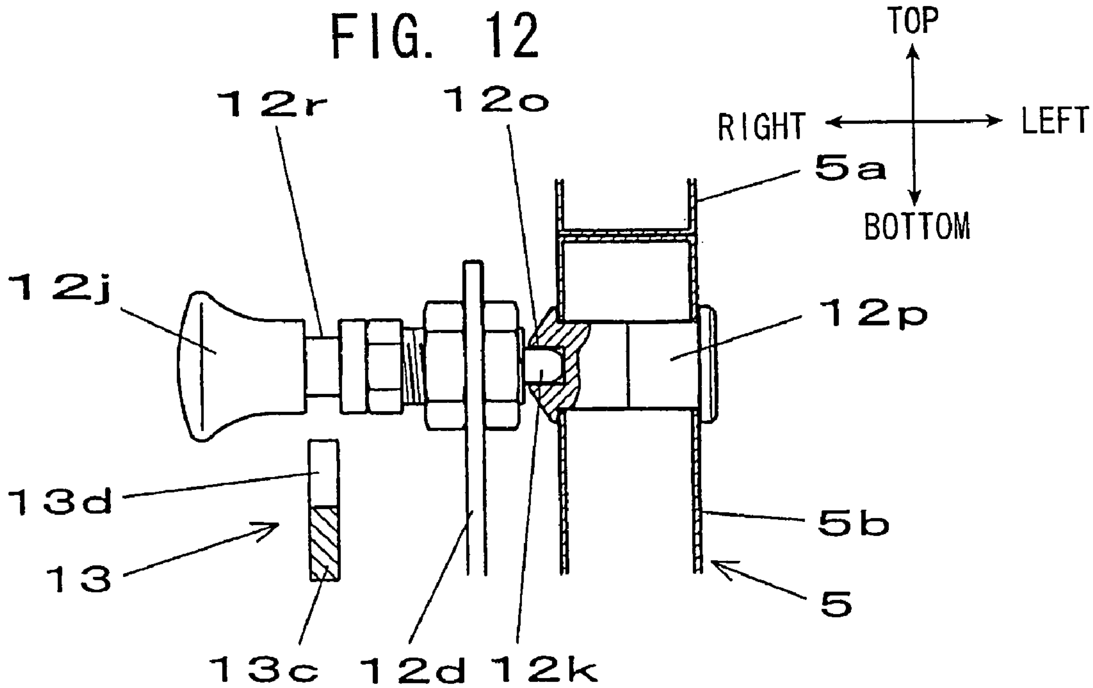
FIG. 12 is an enlarged cross-sectional view of the locking mechanism when the removable section is mounted on the remaining section.

The locking mechanism 12 also has a receiving pin 12*p* provided in the remaining section 5*b* of the wheel 5 (see FIG. 12). The receiving pin 12*p* has a positioning hole 12*o* for receiving the tip end portion of the operating pin 12*k* when the fan-shape plate 12*d* is positioned at the mounting position D as shown in FIGS. 9 and 13.

Figure 10:
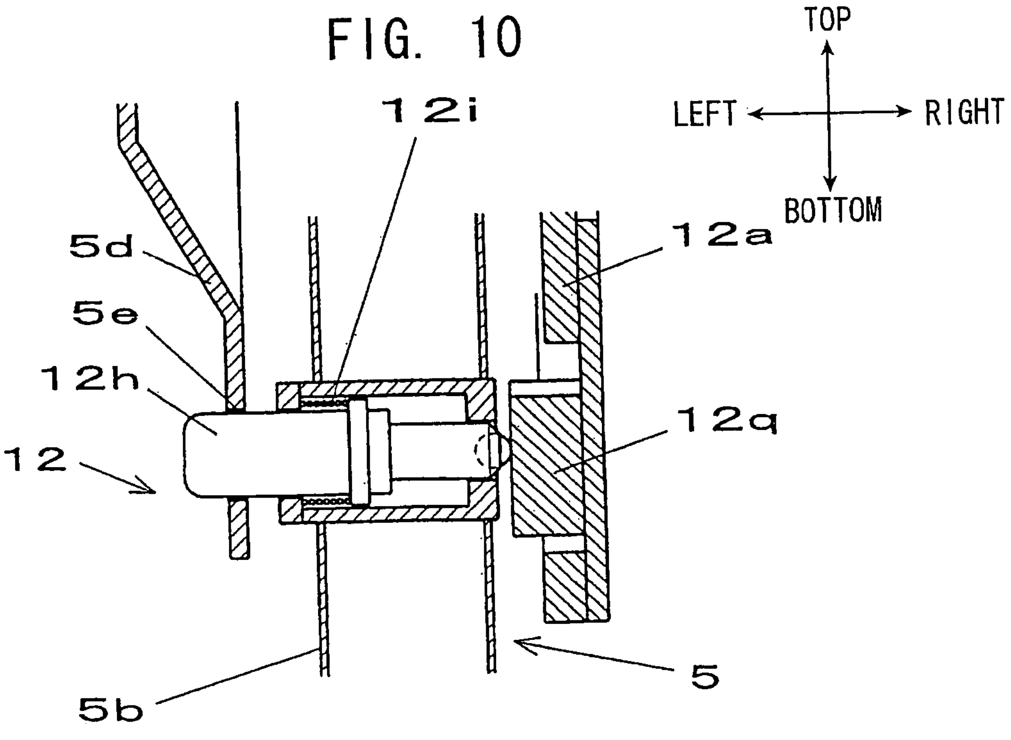
FIG. 10 is an enlarged view of the locking mechanism when the fan-shape plate is positioned at the mounting position.

A rail cam 12*q* is formed on the fan-shaped plate 12*d* for forcing the locking pin 12*h* back in the sliding cylinder 12*g* against the elastic force of the spring 12*i* (see FIG. 10). The locking ping 12*h* is capable of engaging the locking hole 5*e* of the fixing disc 5*d*.

When the fan-shape plate 12*d* is positioned at the locking position G shown in FIGS. 2 and 8, the operating pin 12*k* is fitted into the positioning hole 12*m*. While the wheel 5 is in the separating position F, the operator grips the knob 12*j* and pulls the operating pin 12*k* out of the positioning hole 12*m*. In this state, the operator rotates the fan-shaped plate 12*d* clockwise in FIG. 2 so that the fan-shaped plate 12*d* rotates from the locking position G shown in FIGS. 2 and 8 to the mounting position D shown in FIG. 9.

When the operator releases the knob 12*j* at this position, the rotary plate 12*a* urges the operating pin 12*k* toward and into the positioning hole 12*o* formed in the receiving pin 12*p* (see FIG. 12), thereby fixing the position of the fan-shaped plate 12*d*. When the fan-shaped plate 12*d* is rotated in this way, the rail cam 12*q* forces the locking pin 12*h* back against the spring 12*i* so that the locking pin 12*h* is fitted into the locking hole 5*e* formed in the fixing disc 5*d*, as shown in FIGS. 9 and 10, thereby preventing rotation of the wheel 5.

From the state shown in FIGS. 9 and 10, the operator grips the knob 12*j* and pulls the operating pin 12*k* out from the positioning hole 12*o*. In this state, the operator can rotate the fan-shaped plate 12*d* counterclockwise in FIG. 9 to the position shown in FIG. 2. At this time, the spring 12*l* urges the operating pin 12*k* back into the positioning hole 12*m* formed in the receiving pin 12*n*, thereby fixing the position of the fan-shaped plate 12*d*. By rotating the fan-shaped plate 12*d* in this way, the rail cam 12*q* is separated from the locking pin 12*h*, allowing the locking pin 12*h* to move from the state shown in FIG. 10 to the state shown in FIG. 8. Specifically, the locking pin 12*h* slides along the surface of the rail cam 12*q* while the spring 12*i* pushes the locking pin 12*h* toward the fan-shaped plate 12*d* until the base end of the locking pin 12*h* is extracted from the locking hole 5*e*. When the locking pin 12*h* is extracted from the locking hole 5*e*, the wheel 5 is again free to rotate.

The wheelchair according to the preferred embodiment also includes a safety mechanism 13. The safety mechanism 13 functions to prevent the locking mechanism 12 from being disabled when the removable section 5*a* is separated from the remaining section 5*b* and to allow the locking mechanism 12 to be disabled when the removable section 5*a* is mounted on the remaining section 5*b*.

Figure 11:
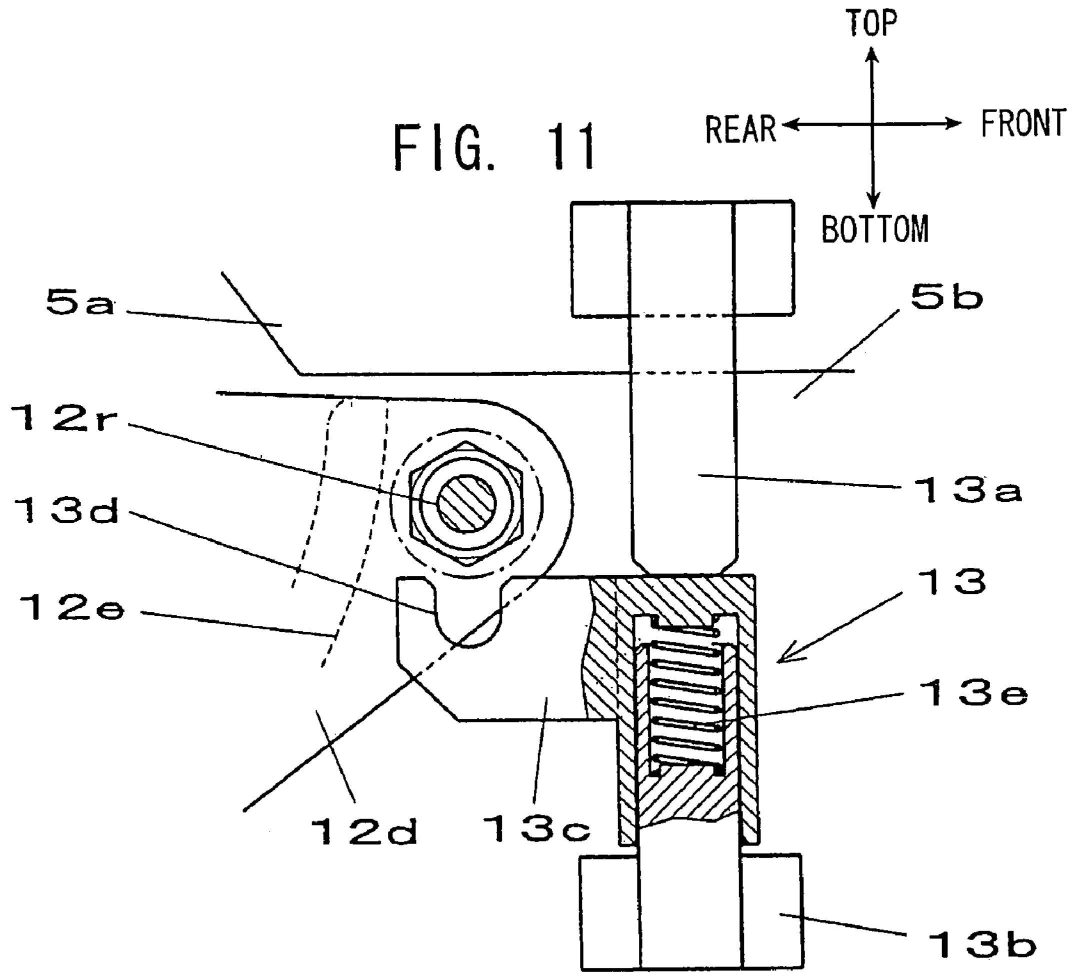
FIG. 11 is an enlarged view of a safety mechanism when a removable section is mounted on a remaining section.

As shown in FIGS. 9, 11, and 12, the safety mechanism 13 includes a pressing plate 13*a* mounted on the removable section 5*a*; a retaining plate 13*b* mounted on the remaining section 5*b*; an engaging member 13*c* disposed on the retaining plate 13*b* so as to be capable of sliding vertically, the engaging member 13*c* is formed with an engaging groove 13*d* which is capable of being detachably inserted into the groove 12*r* formed in the knob 12*j*; and a spring 13*e* disposed in the retaining plate 13*b* for urging the engaging groove 13*d* upward to be engaged in the groove 12*r*.

Figure 14:
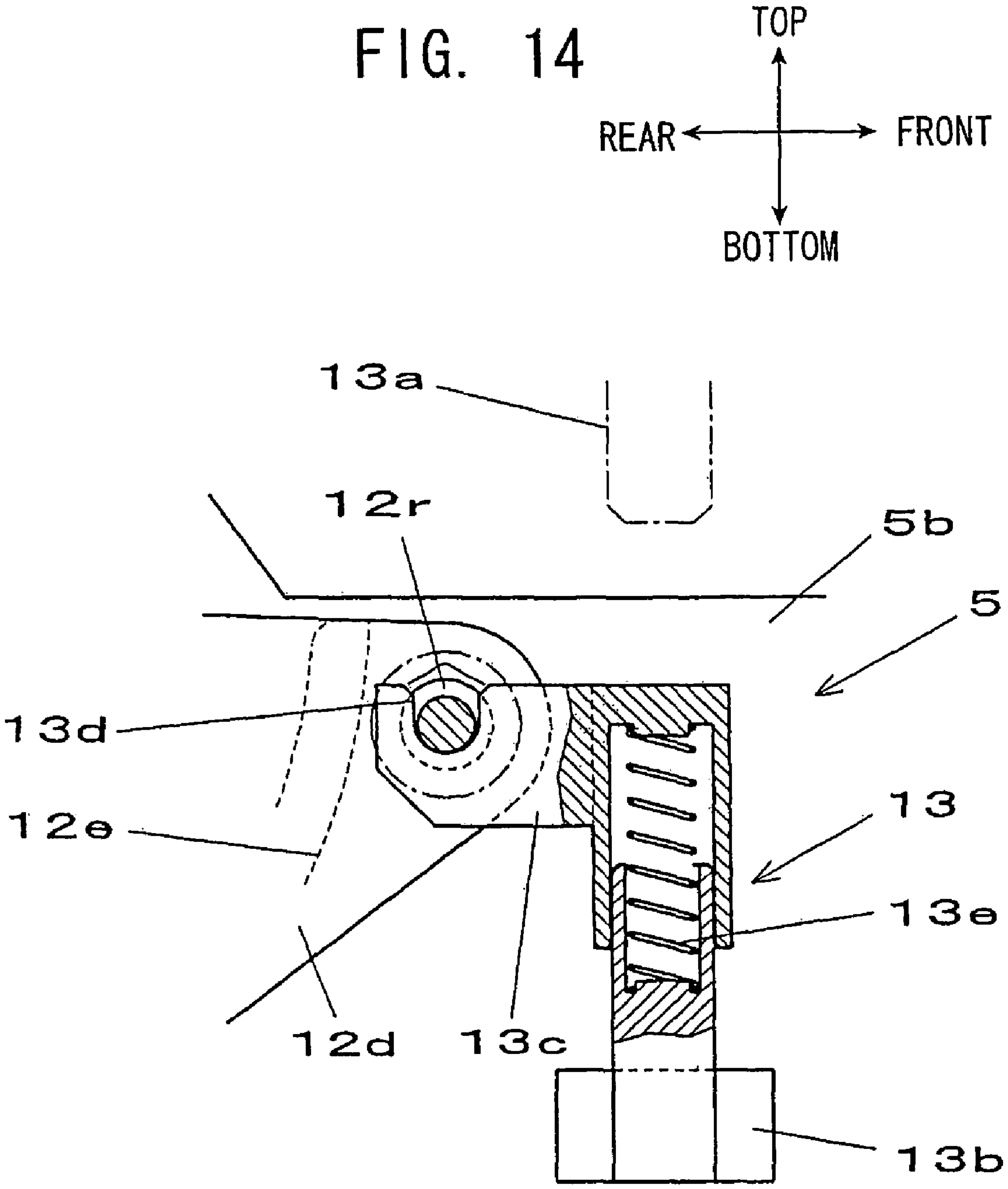
FIG. 14 is an enlarged view of the safety mechanism when the removable section is separated from the remaining section.
Figure 15:
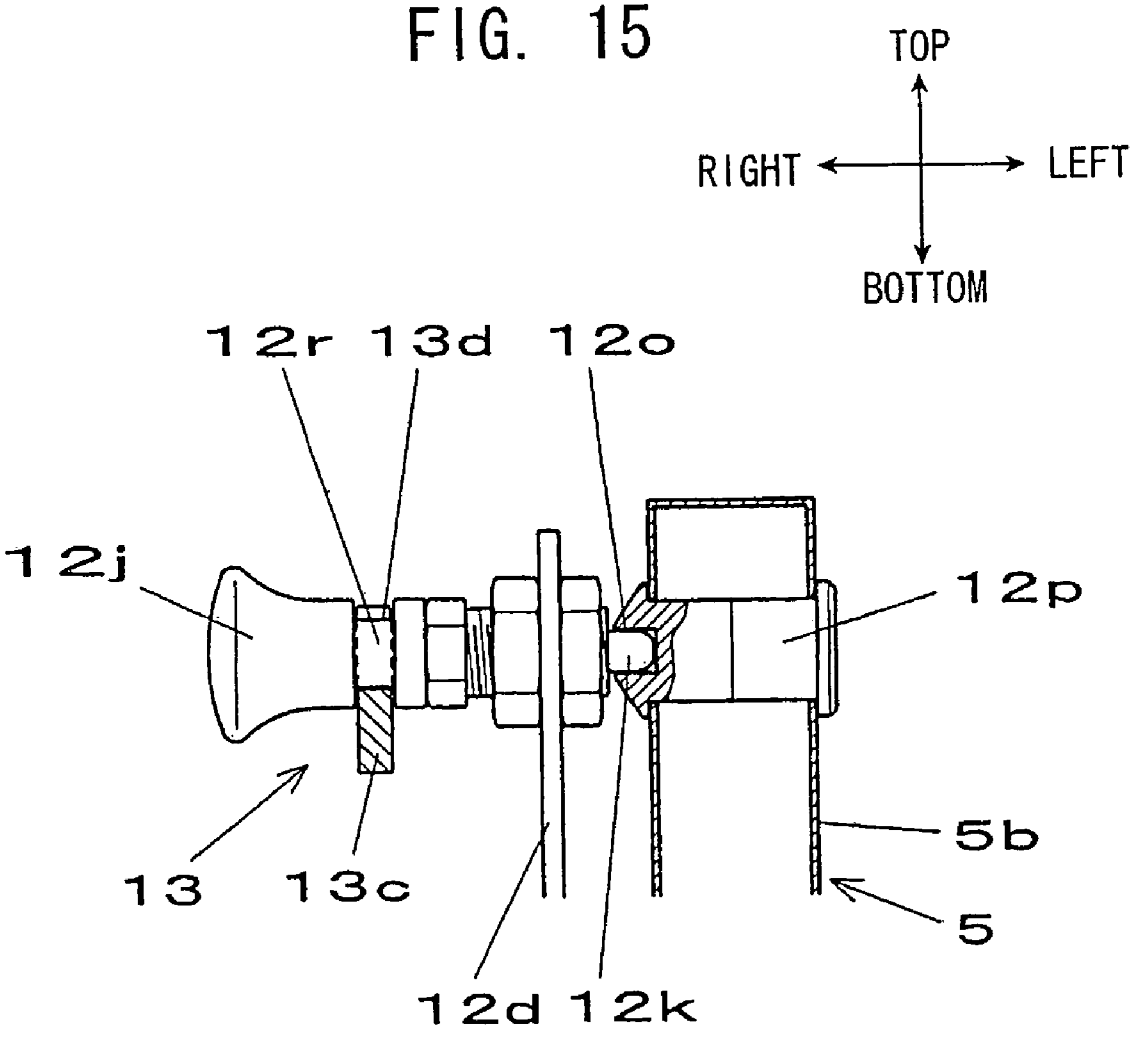
FIG. 15 is an enlarged cross-sectional view of the locking mechanism when the removable section is separated from the remaining section.

As illustrated in FIGS. 13, 14, and 15, when the removable section 5*a* is separated from the remaining section 5*b*, the pressing plate 13*a* is separated from the engaging member 13*c* and the engaging groove 13*d* formed in the engaging member 13*c* is engaged in the groove 12*r* by the urging force of the spring 13*e*. This engagement prevents the operating pin 12*k* from being pulled out of the positioning hole 12*o* formed in the receiving pin 12*p* and, thus, prevents the fan-shaped plate 12*d* from being rotated. Hence, this construction prevents the operator from accidentally pulling the knob 12*j* of the operating pin 12*k* and extracting the base end of the locking pin 12*h* from the locking hole 5*e*, thereby preventing the locking mechanism 12 from being unexpectedly disabled when the wheel 5 is in the separating position F and, thus, preventing the wheel 5 from unexpectedly rotating.

Further, as shown in FIGS. 9, 11, and 12, when the removable section 5*a* is mounted on the remaining section 5*b*, the pressing plate 13*a* presses against the engaging member 13*c*, pushing the engaging member 13*c* against the elastic force of the spring 13*e* so that the engaging groove 13*d* separates from the groove 12*r*. Consequently, the operating pin 12*k* can be pulled outward, allowing the fan-shaped plate 12*d* to be rotated and the base end of the locking pin 12*h* to be extracted from the locking hole 5*e* for disabling the locking mechanism 12.

A removable section separating process will be described below.

Figure 3:
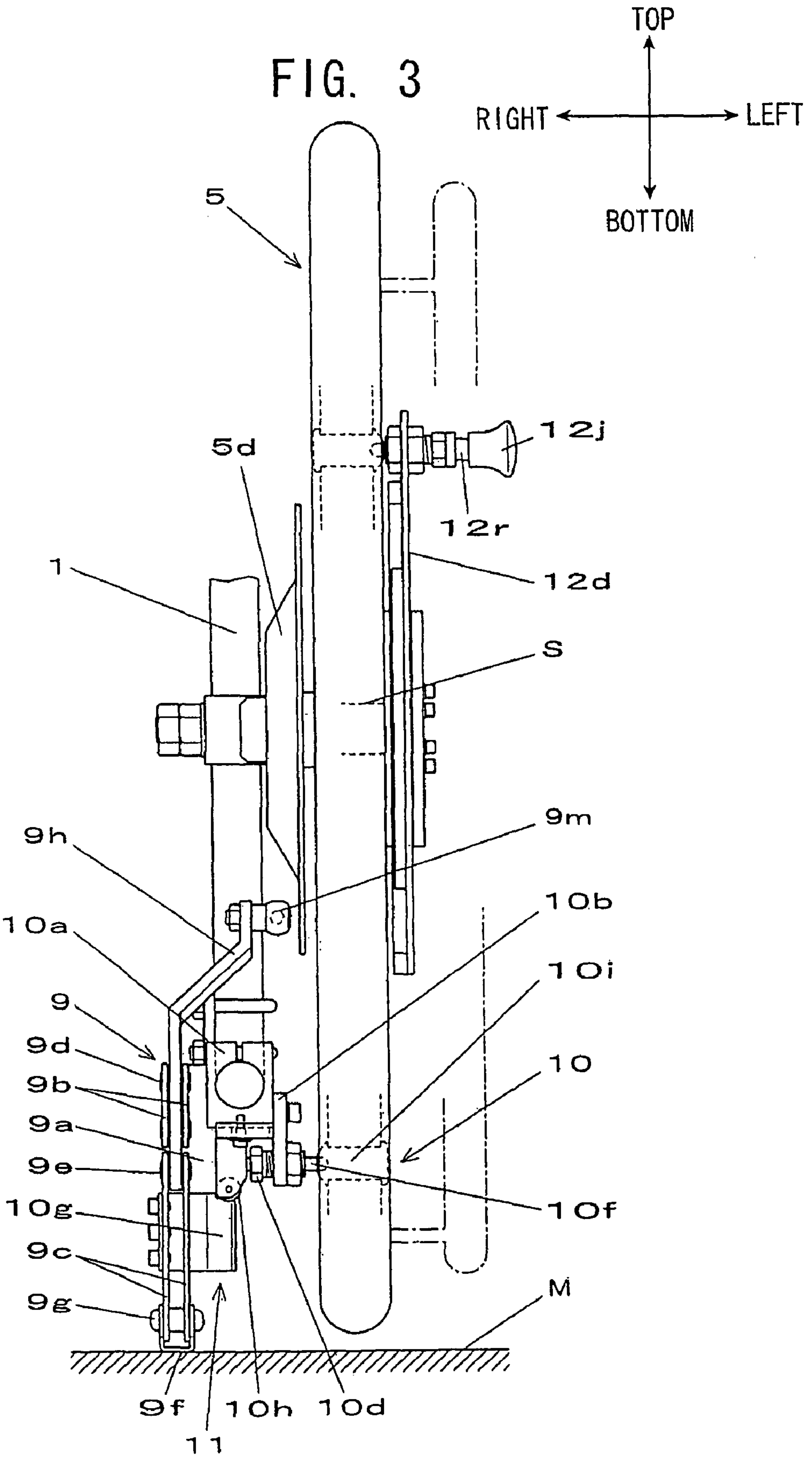
FIG. 3 is an enlarged view of the wheelchair around the wheel when the wheel is elevated off the contact surface.

The wheelchair 1 is in a state as shown in FIG. 1. An operator pulls the handle 9*n* to lift the wheel 5 off the contact surface M so that the wheel 5 can be freely rotated. At this time, the cam plate 10*g* is away from the actuating roller 10*h* and the positioning pin 10*f* is in contact with the wheel 5 by the urging force of the spring 10*e*. When the operator rotates the wheel 5 to be positioned at the separating position F, the positioning pin 10*f* is engaged with the receiving ping 10*i*, thereby fixing the wheel 5 at the separating position F (FIG. 3).

The operator pulls the knob 12*j* from the receiving hole 12*o* of the removable section 5*a* and rotates the fan-shape plate 12*d* in clockwise direction. The fan-shape plate 12*d* is moved from the locking position G to the mounting position D. When the operator releases the knob 12*j* at the mounting position D, the operating pin 12*k* is engaged with the receiving pin 12*p* of the remaining section 5*b*, and simultaneously the locking pin 12*h* is fitted into the locking hole 5*e* (FIG. 10), thereby preventing the wheel 5 from freely rotating.

In this state, the operator can separate the removable section 5*a* from the remaining section 5*b*. Then, the pressing plate 13*a* is away from the engaging member 13*c*, and the engaging groove 13*d* is engaged with the groove 12*r* so that the operator cannot pull the knob 12*j* (FIGS. 14, and 15).

With the wheelchair according to the preferred embodiment described above, clearance K necessary for a person to get on and off the seat 2 can be formed using the wheel separation mechanism 7 to separate the fan-shaped removable section 5*a* from the remaining section 5*b*. Thereafter, the removable section 5*a* can be adjoined with the remaining section 5*b* to allow the seated person use of the wheelchair. Thus, the wheelchair according to the preferred embodiment enables a hospital patient, physically disabled person, elderly person in assisted living, and the like to get on and off the wheelchair smoothly and easily.

By providing the positioning mechanism 10 for fixing the wheel 5 in the separating position F, the operator can rotate the wheel 5 to the separating position F and fittingly insert the positioning pin 10*f* on the frame side of the positioning mechanism 10 into the positioning hole 10*j* on the wheel 5 side to fix the wheel 5 in the separating position F, as shown in FIGS. 2, 3, and 4. Accordingly, the operator can easily fix the wheel 5 in the separating position F in order to form the clearance K required for getting on and off the seat 2, thereby improving the operation for positioning the wheel 5 and, thus, enhancing convenience for the user.

By providing the elevating mechanism 9 on the frame 1 for elevating the wheel 5 off the contact surface M, the operator can pull the operating link 9*k* using the handle 9*n* while the wheel 5 is resting on the contact surface M, as shown in FIG. 7, pushing the foot member 9*f* against the contact surface M to lift the wheel 5 off the contact surface M. While the wheel 5 is elevated off the contact surface M, the wheel 5 can freely rotate. Accordingly, the operator can easily rotate the wheel 5 into the separating position F for forming the clearance K required for getting on and off the seat 2, thereby facilitating the operation for positioning the wheel 5 with the positioning mechanism 10.

With the interlocking mechanism 11 for enabling operations of the positioning mechanism 10 when the wheel 5 is elevated and for disabling operations of the positioning mechanism 10 when the wheel 5 is in contact with the contact surface M, the cam plate 10*g* pulls the actuating roller 10*h* away from the wheel 5 when the wheel 5 is in contact with the contact surface M, as shown in FIG. 6, thereby extracting the positioning pin 10*f* from the positioning hole 10*j*. When the wheel 5 is elevated, the cam plate 10*g* separates from the actuating roller 10*h* so that the positioning pin 10*f* is fittingly inserted into the positioning hole 10*j* through the urging force of the spring 10*e* when the wheel 5 is in the separating position F, as shown in FIG. 4. Thus, the operation of the positioning mechanism 10 is enabled and disabled in association with the operations for raising and lowering the wheel 5, thereby facilitating operations of the positioning mechanism 10.

Further, by providing the locking mechanism 12 for preventing rotation of the wheel 5 in the separating position F, the base end of the locking pin 12*h* is inserted into the locking hole 5*e* when the fan-shape plate 12*d* is positioned at the mounting position D, as shown in FIG. 9, preventing the wheel 5 from rotating. Accordingly, the wheel 5 can be reliably fixed in the separating position F for forming the clearance K required to get on and off the seat 2.

Further, with the safety mechanism 13 for preventing the locking mechanism 12 from being disabled when the removable section 5*a* is separated from the remaining section 5*b* and for allowing the locking mechanism 12 to be disabled when the removable section 5*a* is mounted on the remaining section 5*b*, the pressing plate 13*a* is separated from the engaging member 13*c* when the removable section 5*a* is separated from the remaining section 5*b*, as shown in FIG. 14, so that the engaging groove 13*d* of the engaging member 13*c* is engaged in the groove 12*r* through the urging force of the spring 13*e*. This construction prevents the operating pin 12*k* from being pulled out of the positioning hole 12*o* formed in the receiving pin 12*p*, thereby preventing the fan-shaped plate 12*d* from rotating. Hence, the operator is prevented from mistakenly pulling the knob 12*j* of the operating pin 12*k* and extracting the base end of the locking pin 12*h* from the locking hole 5*e*, thereby preventing the locking mechanism 12 from being unexpectedly disabled when the wheel 5 is in the separating position F. Thus, the remaining section 5*b* of the wheel 5 is prevented from rotating when the removable section 5*a* is separated therefrom, enhancing operational safety.

While the invention has been described in detail with reference to a specific embodiment thereof, it would be apparent to those skilled in the art that many modifications and variations may be made to the structures and design of the frame 1, seat 2, wheel separation mechanism 7, elevating mechanism 9, positioning mechanism 10, interlocking mechanism 11, locking mechanism 12, and safety mechanism 13, for example, without departing from the spirit of the invention, the scope of which is defined by the attached claims.

The present invention according to the preferred embodiment can sufficiently attain the objectives described earlier for improving the prior art.

In the embodiment described above, the separation mechanism 7 is provided only in the right wheel 5. However, the separation mechanism 7 may be provided in at least one of wheels 5.

In the embodiment, the elevating mechanism 9 lifts the right wheel 5. However, the elevating mechanism 9 may be modified to as to lift both right and left wheels 5.

What is claimed is:

1. A wheelchair comprising:

a frame;

a seat disposed on the frame;

a pair of wheels rotatably supported on the frame, at least one of the pair of wheels including a removable section that is configured to form a part of an outer circumference of the wheel and to be removable when the wheel is at a predetermined angular position, and a remaining section that is configured to form the outer circumference of the wheel together with the removable section; and a first locking mechanism that is configured to lock the at least one of the pair of wheels at the predetermined angular position.

2. The wheelchair according to claim 1, further comprising a lifting mechanism that is mounted on the frame and is configured to lift the at least one of the pair of wheels a predetermined distance.

3. The wheelchair according to claim 2, wherein the first locking mechanism includes:

a positioning pin that is mounted on the lifting mechanism; and a receiving member that is mounted on the wheel, the positioning pin being engageable with the receiving member when the wheel is at the predetermined angular position.

4. The wheelchair according to claim 3, wherein the positioning pin is movable between a first position where the positioning pin is in contact with the wheel and a second position where the positioning pin is separated from the wheel, the positioning pin being engageable with the receiving member when the positioning pin is at the first position and the wheel is at the predetermined angular position, wherein the positioning pin is moved from the second position to the first position in interlocking relation with a lifting operation of the lifting mechanism.

5. The wheelchair according to claim 1, further comprising a second locking mechanism that is configured to prevent the wheel from rotating when the wheel is at the predetermined angular position.

6. The wheelchair according to claim 5, further comprising a safety mechanism that is configured to allow the second locking mechanism to be disabled when the removable section is mounted on the remaining section.

7. A wheelchair comprising:

a frame;

a seat disposed on the frame;

a pair of wheels rotatably supported on the frame and disposed at width ends of the frame, at least one of the pair of wheels including a removable section that is configured to form a part of an outer circumference of the wheel and to be removable when the wheel is at a predetermined angular position, and a remaining section that is configured to form the outer circumference of the wheel together with the removable section;

a lifting mechanism that is mounted on the frame and is configured to lift the at least one of the pair of wheels a predetermined distance; and a first locking mechanism that is configured to lock the at least one of the pair of wheels at the predetermined angular position.

8. The wheelchair according to claim 7, wherein the first locking mechanism includes:

a positioning pin that is mounted on the lifting mechanism; and a receiving member that is mounted on the wheel, the positioning pin being engageable with the receiving member when the wheel is at the predetermined angular position.

9. The wheelchair according to claim 8, wherein the positioning pin is movable between a first position where the positioning pin is in contact with the wheel and a second position where the positioning pin is separated from the wheel, the positioning pin being engageable with the receiving member when the positioning pin is at the first position and the wheel is at the predetermined angular position, wherein the positioning pin is moved from the second position to the first position in interlocking relation with a lifting operation of the lifting mechanism.

10. The wheelchair according to claim 7, further comprising a second locking mechanism that is configured to prevent the wheel from rotating when the wheel is at the predetermined angular position.

11. The wheelchair according to claim 10, further comprising a safety mechanism that is configured to allow the second locking mechanism to be disabled when the removable section is mounted on the remaining section.

* * * * *